Patented Oct. 19, 1948

2,451,612

UNITED STATES PATENT OFFICE

2,451,612

PREPARATION OF UNSATURATED FLUOROHYDROCARBONS

Donald D. Coffman and Leroy Frank Salisbury, Wilmington, Del., assignors to E. I. du Pont de Nemours & Company, Wilmington, Del., a corporation of Delaware No Drawing. Application October 29, 1943, Serial No. 508,242

7 Claims. (Cl. 260—653)

This invention relates to unsaturated fluorohydrocarbons. More particularly, it relates to a process for synthesizing fluoro-2-butadiene-1,3, hereinafter called fluoroprene, and 3,3-difluorobutene-1 and their methyl derivatives.

Fluorohydrocarbons have recently become of considerable technical importance and commercial value. Fluoroprene, in particular, which has the valuable property of undergoing polymerization to rubber-like products possessing very useful and unusual properties, is of considerable interest. Heretofore no entirely satisfactory method of synthesizing fluoroprene has been known. The proposed method of reacting monovinylacetylene and hydrogen fluoride in aqueous solution in the presence of certain salts is not well adapted for large scale production because it gives low yields and also because of the severe corrosive action of aqueous hydrogen fluoride on many materials of construction. A method of synthesis capable of giving high yields and, at the same time, avoiding the use of the highly corrosive aqueous hydrogen fluoride, was therefore much to be desired.

Processes have been disclosed, for example, in U. S. Patent 2,098,089, to avoid the use of aqueous hydrogen chloride in the preparation of chloro-2-butadiene-1,3 (chloroprene), the chlorine analog of fluoroprene. It is, however, common knowledge that, in reactions involving the use of hydrogen fluoride, neither guidance nor prediction can be drawn from the reaction of the other hydrogen halides, since fluorine occupies a unique position in the halogen family. In particular, its hydrogen compound is a much weaker acid than the analogous hydrogen compounds of the other halogens.

An object of this invention is to provide a vapor phase, catalytic process for preparing fluoroprene and its methyl derivatives. Another object is to provide a process which gives consistently good yields of such fluoroprenes and avoids the use of aqueous hydrogen fluoride. Still another object is to provide a new fluorohydrocarbon, namely, 3,3-difluorobutene-1, and its methyl derivatives. Other objects will appear as the description proceeds.

These objects are accomplished by the process of this invention, which comprises contacting a gaseous mixture of monovinylacetylene, or its methyl derivatives, and hydrogen fluoride under substantially anhydrous conditions with a catalyst comprising an oxide of mercury, whereby hydrogen fluoride addition products of the monovinylacetylenes are produced.

The methyl derivatives of monovinylacetylene which may be reacted with hydrogen fluoride according to this invention are those of the formula:

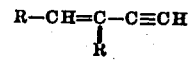

where one R stands for a methyl radical and the other R for hydrogen.

A suitable form of apparatus for use in this process consists of a reactor, which, for small scale operation, may be constructed from a piece of iron pipe, and which contains the catalyst. The reactor may be equipped with an internal temperature measuring device and it is preferably immersed in a bath of a suitable liquid, e. g., water, so that the internal temperature may be controlled. The gaseous mixture, after contact with the catalyst, passes through an absorbent for the excess hydrogen fluoride, if any, such as granular soda-lime, a drier, and finally a trap cooled with solid carbon dioxide-acetone mixture. The reaction product, which collects in the cold trap together with any unreacted monovinylacetylene, is separated into its individual components by fractional distillation.

For efficient operation, it is essential that the reacting gases not be allowed to mix until they enter the reaction chamber. If this precaution is not observed, i. e., if the gases are mixed before they enter the reactor, the reaction between vinylacetylene and hydrogen fluoride proceeds as usual, but the feed line to the reactor soon becomes plugged with a hard brittle solid containing less than 10% fluorine. This unwanted reaction is sometimes so rapid that the run must be stopped and the apparatus dismantled within one hour from the start of the operation. One practical way to overcome this serious disadvantage is to introduce the gases in the reactor separately, e. g., through a T-fitting at the entry end of the reactor. This simple device has the very unexpected result of completely eliminating stoppage which takes place if the gases are mixed beforehand. The gases can, however, be mixed before they come in contact with the catalyst, provided that this is done over a granular material such as charcoal. For example, the T-fitting at the entry end of the reactor may be and preferably is filled with dry, granulated charcoal or with the catalyst itself. In practice, anhydrous fluoride is metered and led to one end of the T-fitting, and anhydrous monovinylacetylene is also metered and led to the other end of the fitting. An inert gas such as nitrogen may be mixed with either the hydrogen fluoride or the monovinylacetylene. The use of such an inert diluent gas appears to be beneficial in the reaction.

While a form of apparatus suitable for use on a small scale has been described, the operation may be conducted successfully in any appropriate apparatus provided the precautions indicated above are observed.

The invention will be better understood by reference to the following examples, in which parts are by weight, unless otherwise specified.

In all of the following examples the apparatus used was that described above, and the reacting gases were mixed only when they entered the reactor. The T-fitting at the entrance of the reactor was filled either with the catalyst itself or with dry granulated charcoal.

*Example 1*

A mixture of dry gases consisting of 130 parts of monovinylacetylene, 100 parts of hydrogen fluoride, and 127 parts of nitrogen is passed at a contact time of about 40 seconds (contact time is defined as the time required to pass a volume of the gas mixture equal to the volume of the catalyst in the packed converter) over a dry catalyst prepared as described below. Water at 40° C. is circulated through the jacket surrounding the reactor. The exit gases are freed of hydrogen fluoride by passage through granulated soda-lime, then freed of any moisture obtained from the soda-lime by passage through anhydrous calcium sulfate, and finally conducted into a trap cooled with solid carbon dioxide and acetone. After six hours of operation the reaction is discontinued and the condensate is fractionated.

The catalyst for this example consists of mercuric oxide-on charcoal. It is prepared by dissolving mercuric oxide in an excess of dilute nitric acid, adding thereto porous carbon, 8-14 mesh, evaporating the solution on a steam bath under water-pump vacuum, and finally roasting at 300° C. to convert the mercuric nitrate to mercuric oxide. The catalyst is finally dried and degassed at 135° C. under 2 mm. pressure. It contains about 2.2 grams of mercuric oxide per liter of catalyst.

Fractionation of the condensate yields about 64 parts of fluoroprene (46% yield) and about 11 parts of 3,3-difluorobutene-1 (6% yield) for each 100 parts of monovinylacetylene consumed. Redistillation results in the isolation of pure fluoroprene boiling at 11.5° to 12° C. at 760 mm. and having the following physical properties:

$$d_4^4, 0.843; N_D^4, 1.400$$

and of pure 3,3-difluorobutene-1 boiling at 24° to 24.5° C. and having the following physical properties:

$$d_4^{10}, 0.937; N_D^{10}, 1.327$$

Fluoroprene is further characterized by means of the following derivatives, typical of conjugated dienes. A sample of fluoroprene is heated at 100° C. for several hours with maleic acid anhydride in a sealed tube. The reaction product is digested in hot water to hydrolyze the acid anhydride. After purification by treatment with decolorizing carbon and by crystallization from water, a dicarboxylic acid is obtained having a melting point of 163° C., and a neutral equivalent of 94.1. The neutral equivalent calculated for fluorotetrahydrophthalic acid is 94.1. The product of the reaction of fluoroprene and maleic anhydride is, therefore, fluorotetrahydrophthalic acid anhydride.

Fluoroprene also reacts with 1,4-naphthoquinone when the two materials are heated in a sealed tube, to yield 2-fluorotetrahydroanthraquinone which is readily oxidized to 2-fluoroanthraquinone, melting point 196° C.

3,3-difluorobutene-1 is identified by hydrogenation to the known 3,3-difluorobutane.

Fluoroprene may be polymerized to valuable rubber-like products. The following description illustrates this polymerization.

A mixture of 100 parts of fluoroprene, 6.1 parts of a 65% solution of the sodium salt of a sulfuric ester of oleyl acetate, 0.5 part of a condensation product of formaldehyde and sodium naphthyl sulfonate prepared according to U. S. Patent 1,336,759, one part of sodium para-toluene sulfinate, 0.64 part of concentrated hydrochloric acid, and 230 parts of water is emulsified by agitation in a sealed vessel and heated at about 40° C. for about 18 hours. The resulting latex is treated with 4 parts of a 50% aqueous dispersion of a 55:45 eutectic mixture of phenyl alphanaphthylamine and diphenylamine and coagulated by pouring into brine. The coagulated fluoroprene polymer is washed with water and dried. The dried polymer is compounded by milling with 2.3 parts of the cyclohexylammonium salt of N-cyclohexyl dithiocarbamic acid, 11.5 parts of rosin, 23 parts of magnesium oxide, 83 parts of reinforcing carbon, and 11.5 parts of zinc oxide for 280 parts of polymer, and cured for 30 minutes at 140° C. The cured polyfluoroprene is tough, rubbery, elastic, and can be stretched 300%.

*Example 2*

A substantially dry mixture of 60 parts of gaseous monovinylacetylene, 50 parts of gaseous hydrogen fluoride and 30 parts of nitrogen is passed in the manner described in Example 1 over a catalyst of mercuric oxide on charcoal containing about 1 g. of mercuric oxide for each liter of charcoal at a contact time of one minute and an external temperature of 40° C. The effluent gases are treated as described in Example 1, and the liquid condensed in the cold trap is separated into its components by fractional distillation. There is obtained, in addition to unreacted monovinylacetylene, fluoroprene and 3,3-difluorobutene-1 in the ratio of 50 parts of the former to 90 parts of the latter.

When the crude reaction product (condensed effluent gas) resulting from the process of this invention is distilled, there is obtained a fairly large intermediate fraction containing both monovinylacetylene and fluoroprene, which must be carefully rectified if the maximum yield of fluoroprene is to be obtained. It has been found that this operation may be largely be eliminated by recycling this intermediate fraction through the reactor with additional hydrogen fluoride. There is then obtained a product much richer in fluoroprene than that which ordinarily results from a single pass of hydrogen fluoride and pure vinylacetylene. Surprisingly, there is no substantial increase in the 3,3-difluorobutene-1 content of the product. This recycling operation has the double advantage that essentially all of the monovinylacetylene is consumed and that the fluoroprene present in the mixture may, if desired, be used satisfactorily in place of an inert gas as diluent for the reaction.

*Example 3*

409 parts by weight of methylvinylacetylene [isopropenyl acetylene, $CH_2=C(CH_3)-C\equiv CH$] and 398 parts by weight of dry hydrogen fluoride, each diluted with an equal volume of nitrogen, are passed without preliminary mixing and during a period of five hours, over a mercury oxide catalyst supported on charcoal and maintained at 90° to 100° C. The resulting gases are passed through soda-lime to remove hydrogen fluoride, then over calcium chloride to remove any water thus introduced. On condensation of the gases, substantially pure methyl fluoroprene may be isolated by fractional distillation. This methyl fluoroprene is a colorless liquid boiling at 47.3°-47.5° C. It has a refractive index of $N_D^{25}$, 1.397 and a density of $d_4^{25}$, 0.847

Its elementary analysis corresponds to the formula $C_5H_7F$. When reacted with maleic anhydride it gives a dibasic acid having a melting point of 183°-184° C. and an elementary analysis of $C_9H_{11}O_4F$.

The catalysts suitable for use in the process of the invention are those consisting of, or comprising, oxides of mercury. They may also be prepared by any convenient means, for instance, by coating a support with red or yellow mercuric oxide or by impregnating a support with a compound of mercury which is convertible to mercuric oxide by heating. Among such compounds may be mentioned mercuric nitrate (see J. Newton Friend, Textbook of Inorganic Chemistry, vol. III, part II, p. 268, Charles Griffin and Co., London, 1926), mercuric carbonate or basic carbonate, and mercuric hydroxide.

The catalysts suitable for use in this process may be used in the massive form, but it is usually preferable to place them on a suitable support such as charcoal. Another excellent support is magnesium fluoride, which has the great advantage that a mercuric oxide catalyst supported thereon does not lose its activity even after prolonged periods of operation. Such a magnesium fluoride-supported catalyst may be prepared by impregnating precipitated magnesium fluoride with an aqueous solution of mercuric nitrate, evaporating to dryness at 100° C. and finally roasting at a temperature sufficient to decompose the mercuric nitrate, i. e., about 300° C. Higher roasting temperatures may be used if desired. A further advantage resulting from the use of a magnesium fluoride support is that, during the roasting period, there is much less mercury lost than during the similar operation using a charcoal support.

The reaction of monovinylacetylenes with hydrogen fluoride may be conducted at any desired temperature, but at temperatures below 0° C. tar formation is greatly increased. The preferred temperature range (internal temperature at the hottest point) is from about 20° to about 100° C. Higher temperatures, such as 150° C. or even higher may be used but they are not recommended since the catalyst becomes less active and/or unstable at such temperatures. The use of inert diluents such as nitrogen or carbon dioxide is beneficial, though not essential. The presence of a diluent reduces the occurrence of side reactions such as polymerization. The preferred concentration of diluent is about 65% by volume of the total gas mixture.

In general, it is preferable to use substantially chemically equivalent quantities of hydrogen fluoride and the monovinylacetylene, i. e., mol for mol, in order to obtain maximum yields of the fluoroprene. However, an excess of either reactant may be used if desired. If it is desired to increase the yield of 3,3-difluorobutene-1, this may be done by increasing the proportions of hydrogen fluoride. Atmospheric pressure is preferably used, but sub-atmospheric or super-atmospheric pressure may be used. The only limitation is that the reactants and products must remain gaseous under the combination of temperature and pressure employed.

The contact times given in the examples, which range from about 40 seconds to about 1 minute, are especially economical. Longer or shorter contact times may, however, be used. In particular, if a higher yield of 3,3-difluorobutene-1 is desired, it is advantageous to increase the contact time as well as the proportion of hydrogen fluoride.

The process described herein gives a mixture of fluoroprene and 3,3-difluorobutene-1. It is possible, however, to control in a large measure the relative proportion of the two reaction products. As has been indicated before, the proportions of 3,3-difluorobutene-1 may be increased by increasing the ratio of hydrogen fluoride to monovinylacetylene and also by increasing the contact time. In addition, the concentration of active ingredient in the total catalyst has an influence. For example, the catalyst of Example 1, which contains about 2.2 grams of mercuric oxide per liter of catalyst, gives a mol ratio of fluoroprene to 3,3-difluorobutene-1 of about 7 to 1. On the other hand, the mercuric oxide catalyst of Example 2, which contains about 1 gram of mercuric oxide per liter of catalyst, gives a mol ratio of fluoroprene to 3,3-difluorobutene-1 of about 10 to 7. Thus, it is seen that the process is quite flexible and can be adjusted to give technically useful yields of either fluoroprene or 3,3-difluorobutene-1.

Fluoroprene and its methyl homologs are of particular value as an intermediate in the preparation of rubber-like polymers which can be cured, after addition of suitable compounding ingredients, to yield strong, highly elastic vulcanizates. These can be used instead of rubber in many instances, and can also be used in other applications requiring an elastic substance for which natural rubber is less suitable, for example, in applications requiring unusual oil and freeze resistance. Polyfluoroprene is also highly resistant to the action of light, heat, and many chemicals. Since rubber is readily degraded by oil, heat and light, cured polyfluoroprene can thus be used for many applications for which natural rubber is unsuited. Polyfluoroprene can be used to coat fabrics by any of the known processes, such as calendering, laminating, spreading or impregnating.

3,3-difluorobutene-1 and its methyl homologs are of interest in many chemical syntheses leading to other fluorine derivatives because of the reactivity of its double bond. For example, it may be oxidized to alpha,alpha-difluoropropionic acid.

We claim:

1. A process for producing fluorohydrocarbons which comprises contacting a mixture of a compound of the class consisting of monovinylacetylene and monomethylvinylacetylene, and hydrogen fluoride in the vapor phase under substantially anhydrous conditions with a catalyst comprising an oxide of mercury, the monovinyl acetylene and hydrogen fluoride being mixed together only at the time they are brought in contact with the catalyst.

2. A process for producing fluorohydrocarbons which comprises contacting a mixture of a compound of the class consisting of monovinylacetylene and monomethylvinylacetylene, and hydrogen fluoride in the vapor phase under substantially anhydrous conditions with a catalyst comprising an oxide of mercury supported on charcoal, the monovinyl acetylene and hydrogen fluoride being mixed together only at the time they are brought in contact with the catalyst.

3. A process for producing fluorohydrocarbons which comprises contacting a mixture of a compound of the class consisting of monovinylacetylene and monomethylvinylacetylene, and hydrogen fluoride in the vapor phase under substantially anhydrous conditions with a catalyst comprising an oxide of mercury supported on magnesium fluoride, the monovinyl acetylene and hydrogen fluoride being mixed together only at the time they are brought in contact with the catalyst.

4. A process for producing fluorohydrocarbons which comprises contacting a mixture of a compound of the class consisting of monovinylacetylene and monomethylvinylacetylene, and hydrogen fluoride in the vapor phase under substantially anhydrous conditions with a catalyst comprising an oxide of mercury, the monovinylacetylene compound and hydrogen fluoride being mixed together only at the time they are passed over said catalyst, the reaction being carried out in the presence of the catalyst at temperatures of from 20° to 100° C.

5. The process for preparing fluoroprene and 3,3-difluorobutene-1 which comprises contacting a mixture of substantially equal molecular amounts of monovinylacetylene and hydrogen fluoride in the vapor phase and under substantially anhydrous conditions with a catalyst comprising an oxide of mercury supported on magnesium fluoride, the monovinyl acetylene and the hydrogen fluoride being mixed together only at the time they are brought in contact with the catalyst.

6. The process for preparing fluoroprene and 3,3-difluorobutene-1 which comprises contacting a mixture of substantially equal molecular amounts of monovinylacetylene and hydrogen fluoride in the vapor phase and under substantially anhydrous conditions with a catalyst comprising an oxide of mercury supported on magnesium fluoride at temperatures of from 20° to 100° C., the monovinyl acetylene and the hydrogen fluoride being mixed together only at the time they are brought in contact with the catalyst.

7. A process for preparing fluoroprene and 3,3-difluorobutene-1 which comprises contacting a mixture of substantially equal molecular amounts of monovinylacetylene and hydrogen fluoride in the vapor phase under substantially anhydrous conditions with a catalyst comprising an oxide of mercury, condensing the effluent gases, distilling the condensate, and recycling the intermediate fraction comprising monovinylacetylene and fluoroprene together with added hydrogen fluoride over said catalyst, the monovinyl acetylene and the hydrogen fluoride being mixed together only at the time they are brought in contact with the catalyst.

DONALD D. COFFMAN.
LEROY FRANK SALISBURY.

REFERENCES CITED

The following references are of record in the file of this patent:

UNITED STATES PATENTS

| Number | Name | Date |
|---|---|---|
| 1,950,431 | Carothers et al. | Mar. 13, 1934 |
| 2,098,089 | Eberhardt et al. | Nov. 2, 1937 |
| 2,118,901 | Soll | May 31, 1938 |